(12) United States Patent
Lin et al.

(10) Patent No.: US 11,903,426 B2
(45) Date of Patent: Feb. 20, 2024

(54) ELECTRONIC CIGARETTE CONTROLLABLE BY MOBILE SOFTWARE AND CONTROLLING METHOD THEREOF

(71) Applicant: HUIZHOU HAPPY VAPING TECHNOLOGY LIMITED, Guangdong (CN)

(72) Inventors: Guangrong Lin, Guangdong (CN); Xianbin Zheng, Guangdong (CN); Xiyong Zhang, Guangdong (CN)

(73) Assignee: HUIZHOU HAPPY VAPING TECHNOLOGY LIMITED, Huizhou (CN)

( * ) Notice: Subject to any disclaimer, the term of this patent is extended or adjusted under 35 U.S.C. 154(b) by 508 days.

(21) Appl. No.: 17/311,692

(22) PCT Filed: Dec. 5, 2019

(86) PCT No.: PCT/CN2019/123172
§ 371 (c)(1),
(2) Date: Jun. 8, 2021

(87) PCT Pub. No.: WO2020/140676
PCT Pub. Date: Jul. 9, 2020

(65) Prior Publication Data
US 2022/0022549 A1  Jan. 27, 2022

(30) Foreign Application Priority Data

Jan. 4, 2019 (CN) .......... 201910009556.X

(51) Int. Cl.
*A24F 40/57* (2020.01)
*A24F 40/53* (2020.01)
(Continued)

(52) U.S. Cl.
CPC .............. *A24F 40/57* (2020.01); *A24F 40/53* (2020.01); *A24F 40/60* (2020.01); *A24F 40/65* (2020.01);
(Continued)

(58) Field of Classification Search
CPC .......... A24F 40/57; A24F 40/53; A24F 40/65; A24F 40/90; A24F 40/60; G05B 19/0423; G05B 2219/25186; G05B 2219/25257
(Continued)

(56) References Cited

U.S. PATENT DOCUMENTS

| | | | | |
|---|---|---|---|---|
| 2015/0075545 A1* | 3/2015 | Xiang | ..................... | A24F 40/53 |
| | | | | 429/61 |
| 2015/0288468 A1* | 10/2015 | Xiang | ..................... | A24F 40/65 |
| | | | | 455/500 |
| 2016/0080469 A1* | 3/2016 | Liu | ..................... | H04W 12/08 |
| | | | | 709/219 |

FOREIGN PATENT DOCUMENTS

| | | |
|---|---|---|
| CN | 104321779 A | 1/2015 |
| CN | 105848503 A | 8/2016 |
| CN | 209215909 U | 8/2019 |

OTHER PUBLICATIONS

International Search Report of PCT Patent Application No. PCT/CN2019/123172 dated Mar. 2, 2020.

* cited by examiner

*Primary Examiner* — Khiem M Nguyen

(57) ABSTRACT

The disclosure provides an electronic cigarette controllable by mobile software and a controlling method thereof. The electronic cigarette comprises a vaporizer having a heating resistor for heating and vaporizing electronic cigarette liquid and comprises a battery assembly having a battery and a control circuit board, wherein the control circuit board is arranged with a microcontroller, a Bluetooth data transmis-
(Continued)

sion unit and an unlock switch unit, wherein the Bluetooth data transmission unit is configured with a mobile software controlling terminal which is the APP installed on a smart phone, the APP contains encryption information which can be sent through mobile Bluetooth to the Bluetooth data transmission unit and then to the microcontroller, and the unlock switch unit is configured to perform unlock and power on operation when the encryption information is identified by the microcontroller.

11 Claims, 5 Drawing Sheets

(51) Int. Cl.
*A24F 40/65* (2020.01)
*A24F 40/90* (2020.01)
*A24F 40/60* (2020.01)
*G05B 19/042* (2006.01)

(52) U.S. Cl.
CPC .......... *A24F 40/90* (2020.01); *G05B 19/0423* (2013.01); *G05B 2219/25186* (2013.01); *G05B 2219/25257* (2013.01)

(58) Field of Classification Search
USPC ......................................................... 131/328
See application file for complete search history.

ELECTRONIC CIGARETTE CONTROLLABLE BY MOBILE SOFTWARE AND CONTROLLING METHOD THEREOF

TECHNICAL FIELD

The disclosure relates to the field of electronic cigarettes, more particularly to an electronic cigarette which is controllable by mobile software and a controlling method of an electronic cigarette controllable by mobile software.

BACKGROUND

It is known that tobacco cigarettes contain tobacco tars which are very harmful to the human body. The electronic cigarettes usually heat the e-cigarette liquid by means of a vaporizing device, to produce vapor for the smoker. Since the e-cigarette liquid does not contain the tobacco tar, the harm to the human body is reduced. Thus, the electronic cigarettes are widely used and gradually replace tobacco cigarettes.

With the rise in popularity of the electronic cigarette, the electronic cigarette is widely available in social lives and general homes. The juveniles those lack self-discipline may try to use the electronic cigarette without knowledge of appropriate method of use, which may have an adverse effect on society and family. To avoid such adverse effect, it is necessary to prevent the juveniles from using the electronic cigarette. The existing electronic cigarettes have failed to effectively overcome the problem of how to encrypt the electronic cigarette and provide personal customization.

SUMMARY

Technical Problem

An object of the disclosure is to overcome the above deficiencies and provide an electronic cigarette which is controllable by mobile software and a controlling method thereof. The electronic cigarette controllable by mobile software comprises a battery assembly arranged with a Bluetooth data transmission unit, and thus can be unlocked depending on the mobile Bluetooth signal sent from the APP controlling terminal, to achieve activation.

Technical Solutions

The disclosure provides a technical solution as follow. The electronic cigarette controllable by mobile software comprises a vaporizer and a battery assembly connected with each other, wherein the vaporizer comprises a heating resistor for heating and vaporizing the electronic cigarette liquid, the battery assembly comprises a battery and a control circuit board, the control circuit board is arranged with a microcontroller, and a Bluetooth data transmission unit and an unlock switch unit which are connected with the microcontroller, wherein the Bluetooth data transmission unit is configured with a mobile software controlling terminal, the mobile software controlling terminal is the APP installed on a smart phone, the APP contains encryption information which can be sent through mobile Bluetooth to the Bluetooth data transmission unit and then to the microcontroller, the microcontroller is configured to identify the encryption information, and the unlock switch unit is configured to perform unlock and power on operation when the encryption information is identified by the microcontroller.

Preferably, the control circuit board may be further arranged with a resistance detection unit and a voltage output control unit, wherein the resistance detection unit may be electrically connected with the heating resistor and the microcontroller, respectively, the resistance detection unit may be configured to detect the resistance value of the heating resistor and feedback the resistance value signal to the microcontroller, the microcontroller may be electrically connected with the voltage output control unit, and the voltage output control unit may be configured to output voltage to the heating resistor under control of the microcontroller.

Preferably, a trigger switch may be further arranged inside the vaporizer or inside the battery assembly, and the trigger switch may be a microphone-type automatic air flow switch.

Preferably, the control circuit board may be further arranged with a battery charging unit, a battery protection unit, a battery supply unit, and a battery detection unit, wherein the battery charging unit may be configured to charge the battery, the battery may be configured to supply power to the voltage output control unit by the battery protection unit and the battery supply unit in sequence, the microcontroller may be electrically connected with the battery charging unit, the battery protection unit, and the battery detection unit, respectively, the battery detection unit may be configured to detect the electrical signal of the battery and feedback to the microcontroller, and the microcontroller may provide over-current protection, overload protection, and short circuit protection for the battery by means of the battery protection unit.

Preferably, a display unit may be arranged on an outer surface of the vaporizer or of the battery assembly and may be electrically connected with the microcontroller.

Preferably, the operation interface of the APP may include a digital encryption module, a graphic encryption module, a fingerprint encryption module, an iris encryption module, and a face recognition encryption module, wherein the digital encryption module may be configured to identify the preset digital encryption information, the graphic encryption module may be configured to identify the preset graphic encryption information, the fingerprint encryption module may be configured to identify the preset fingerprint encryption information, the iris encryption module may be configured to identify the preset iris encryption information, and the face recognition encryption module may be configured to identify the face encryption information.

Preferably, the operation interface of the APP may include a power setting and adjusting module, a heating resistor value selection module, a vaporizer dry-heating setting module, and an information management and query module, wherein the power setting and adjusting module may be configured to adjust the power of the heating resistor, to achieve controlling of the amount of the vapor generated during using, the heating resistor value selection module may be configured to select corresponding resistance value of the heating resistor for various vaporizers, to achieve corresponding heating temperature, the vaporizer dry-heating setting module may be configured to set an individual preset dry-heating temperature value for an individual vaporizer, and the information management and query module may be configured to collect, manage and query the information with respect to usage records.

Preferably, the operation interface of the APP may include a Bluetooth test module, a Bluetooth communication and matching module, and a vaporizer information query module, wherein the Bluetooth test module may be configured to test the mobile Bluetooth and determine whether it is successfully matched and connected with the Bluetooth data transmission unit, the Bluetooth communication and matching module may be configured to match and connect the mobile Bluetooth with the Bluetooth data transmission unit, and the vaporizer information query module may be configured to query relevant information with respect to the type of the vaporizer which is connected with the battery assembly.

Preferably, the operation interface of the APP may include a wireless Bluetooth transmission module, a nearby friend viewing module, a vaporizer purchase link module, and a user registration module, wherein the wireless Bluetooth transmission module may be configured to communicate with the mobile Bluetooth, the nearby friend viewing module may be configured to allow viewing of the user information of the nearby users who have same products, the vaporizer purchase link module may be configured to provide links to the web-pages of the electronic cigarette manufacturers or sellers, to allow users to conveniently select and purchase new products, and the user registration module may be configured to allow registration of users as members, to facilitate post-sales service.

Preferably, the APP may be further provided with a background cloud user management platform, and the background cloud user management platform may comprise a communication module, a user management module, and a usage data query module, wherein the communication module may be configured to communicate with the user's APP, the user management module may be configured to allow the sellers to manage registered users information, and the usage data query module may be configured to query information with respect to usage data of the electronic cigarette, to facilitate post-sales service of the seller.

The disclosure provides another technical solution as follow. The controlling method of an electronic cigarette controllable by mobile software comprises steps as follows.

(1) Setting encryption information for activating the electronic cigarette, a protocol for communicating with the APP, and a preset stand-by time in the microcontroller of the electronic cigarette;

(2) Determining, by means of the microcontroller, whether the electronic cigarette is in an on state with the unlock switch unit being turned on, if yes, go to the step (13); if no, go to the next step;

(3) Turning on the Bluetooth of the electronic cigarette;

(4) Determining whether the Bluetooth of the electronic cigarette seeks out a mobile Bluetooth signal, if yes, go to the step (6); if no, go to the next step;

(5) Determining whether a mobile Bluetooth signal is searched or not in a period of time, if yes, go to the next step; if no, go to the step (15);

(6) Determining, by means of the microcontroller, whether the Bluetooth have previously been matched with the mobile on which the APP is installed, if yes, go to the step (8); if no, go to the next step;

(7) Matching, by means of the microcontroller, the Bluetooth of the electronic cigarette with the mobile Bluetooth, and storing mobile Bluetooth information;

(8) Connecting mobile Bluetooth;

(9) Determining, by the APP, whether a power on command is received from the user, if yes, go to the next step; if no, go back to the step (2);

(10) Sending encryption information to the Bluetooth data transmission unit of the electronic cigarette by mobile Bluetooth;

(11) Determining, by means of the microcontroller, whether the encryption information is correct or not, if yes, go to the next step; if no, go back to the step (2);

(12) Controlling, by means of the microcontroller, the unlock switch unit to perform an unlock operation, to power on the electronic cigarette;

(13) Entering a using state in which the vapor is available for the user;

(14) Entering a stand-by state when the user stops using, and determining, by means of the microcontroller, whether the stand-by time exceeds the preset time or not, if yes, go to the next step; if no, go back to the step (13);

(15) Controlling, by means of the microcontroller, the electronic cigarette to turn off automatically.

Advantages

The electronic cigarette controllable by mobile software comprises a battery assembly arranged with a Bluetooth data transmission unit, and thus can be unlocked and powered on depending on the mobile Bluetooth signal sent from the APP controlling terminal. It effectively achieves encryption for the electronic cigarette and makes it possible to provide personal customization, thereby preventing the juveniles from using the electronic cigarette to result in an adverse effect on society and family.

DETAILED DESCRIPTION OF ILLUSTRATED EMBODIMENTS

In order to make purposes, technical solutions and advantages of the disclosure clearer, the disclosure will be further explained in detail with reference to drawings and embodiments described hereinafter. It should be understood that the specific embodiments described herein are merely used to explain the disclosure and are not intended to limit the present invention.

Embodiments

Figure 1:
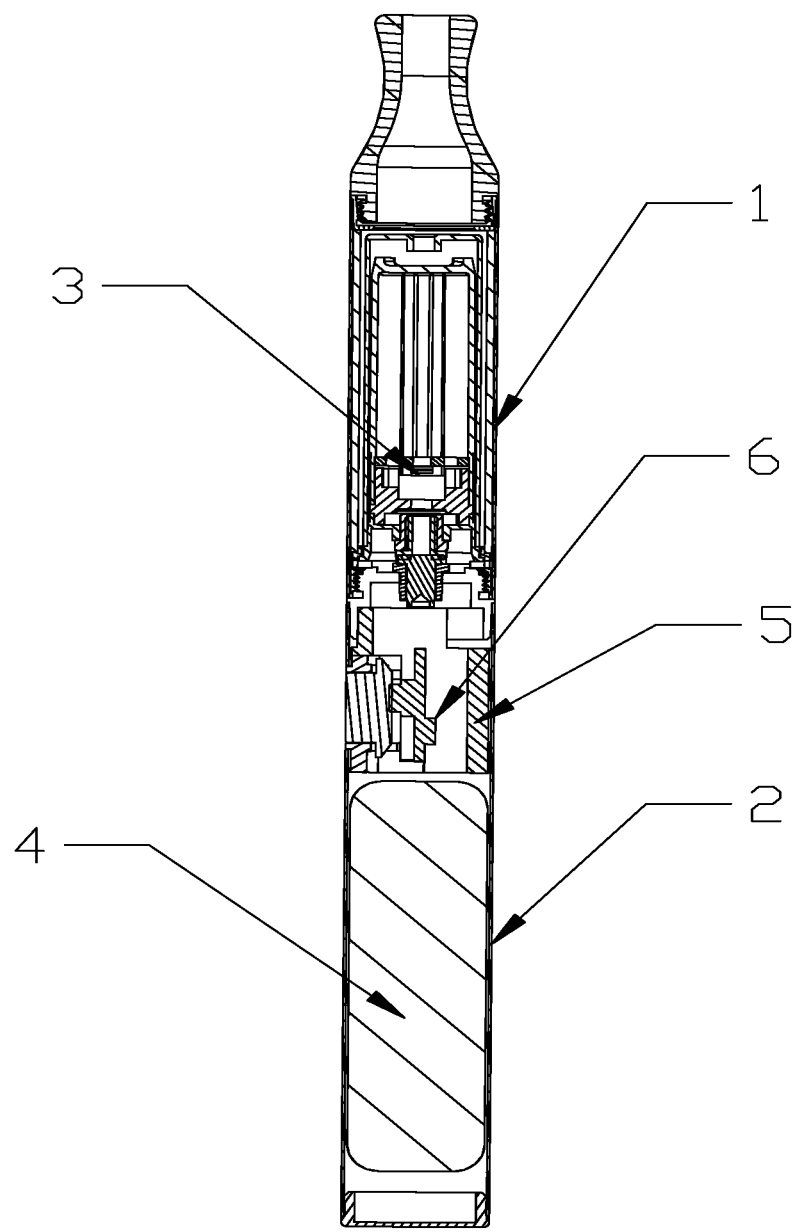
FIG. 1 is a cross-sectional view of an electronic cigarette controllable by mobile software according to the disclosure.

Referring to FIG. 1, the disclosure provides an electronic cigarette controllable by mobile software, comprising a vaporizer 1 and a battery assembly 2 connected with each other. Herein, the vaporizer 1 comprises a heating resistor 3 for heating and vaporizing the electronic cigarette liquid. A battery 4 and a control circuit board 5 are disposed inside the battery assembly 2. A trigger switch 6 is arranged inside the vaporizer 1 (or inside the battery assembly 2). The trigger switch 6 may be a microphone-type automatic air flow switch.

Figure 2:
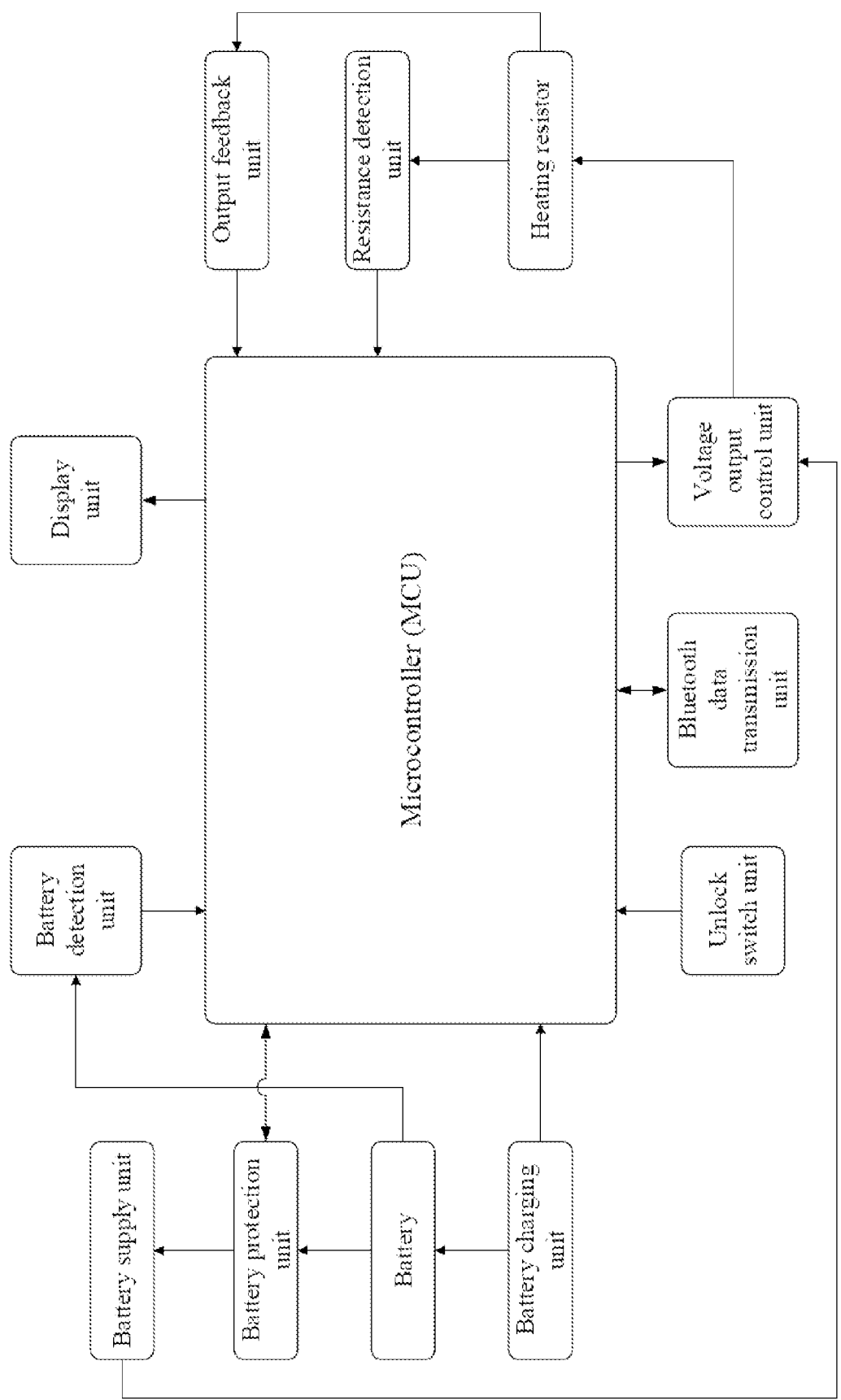
FIG. 2 is a functional diagram of a control circuit board of an electronic cigarette controllable by mobile software according to the disclosure.

Referring to FIG. 2, the control circuit board is arranged with a plurality of components and circuits, including a microcontroller, a Bluetooth data transmission unit connected with the microcontroller, and an unlock switch unit. Herein, the Bluetooth data transmission unit is configured with a mobile software controlling terminal. The Bluetooth data transmission unit has a Bluetooth for wirelessly communicating with mobile Bluetooth. The mobile software controlling terminal may be the APP installed on a smart phone. The APP includes encrypted information, which is sent through mobile Bluetooth to Bluetooth data transmission unit and then to the microcontroller. The microcontroller is configured to identify the encrypted information and then perform unlock and power on operation by means of the unlock switch unit. Without executing the decryption operation by means of the APP, the electronic cigarette of the disclosure cannot be activated. In this way, it prevents juveniles from using it. The microcontroller (MCU) of the disclosure may be a single chip or a plurality of microcontroller chips.

Referring to FIG. 2, the control circuit board is further arranged with a plurality of components and circuits, including a resistance detection unit and a voltage output control unit. Herein, the resistance detection unit is electrically connected with the heating resistor and the microcontroller, respectively. The resistance detection unit is configured to detect the resistance value of the heating resistor and feedback the resistance value signal to the microcontroller. The microcontroller is electrically connected with the voltage output control unit, in such a manner that the voltage output control unit is controlled by means of the microcontroller to output voltage to the heating resistor. During using of the electronic cigarette of the disclosure, the trigger switch 6 may be triggered after the unlock and power on operation. Then, the voltage output control unit may be controlled by means of the microcontroller to output voltage to the heating resistor. When the heating resistor is energized to generate heat, electronic cigarette liquid is vaporized to generate vapor. When the use of the electronic cigarette is temporarily stopped during using, the trigger switch can be inactivated, and the electronic cigarette may enter a stand-by state.

Referring to FIG. 2, the control circuit board is further arranged with a plurality of components and circuits, including a battery charging unit, a battery protection unit, a battery supply unit, and a battery detection unit. Herein, the battery charging unit is configured to charge the battery. The battery is configured to supply power to the voltage output control unit by the battery protection unit and the battery supply unit in sequence. The microcontroller is electrically connected with the battery charging unit, the battery protection unit, and the battery detection unit, respectively. The battery detection unit is configured to detect the electrical signal of the battery and feedback it to the microcontroller. The microcontroller provides over-current protection, overload protection, and short circuit protection for the battery by means of the battery protection unit.

Referring to FIG. 2, a display unit is arranged on an outer surface of the vaporizer or of the battery assembly and is electrically connected with the microcontroller. The display unit is configured to display some running parameters during working and information of interaction with users.

Figure 3:
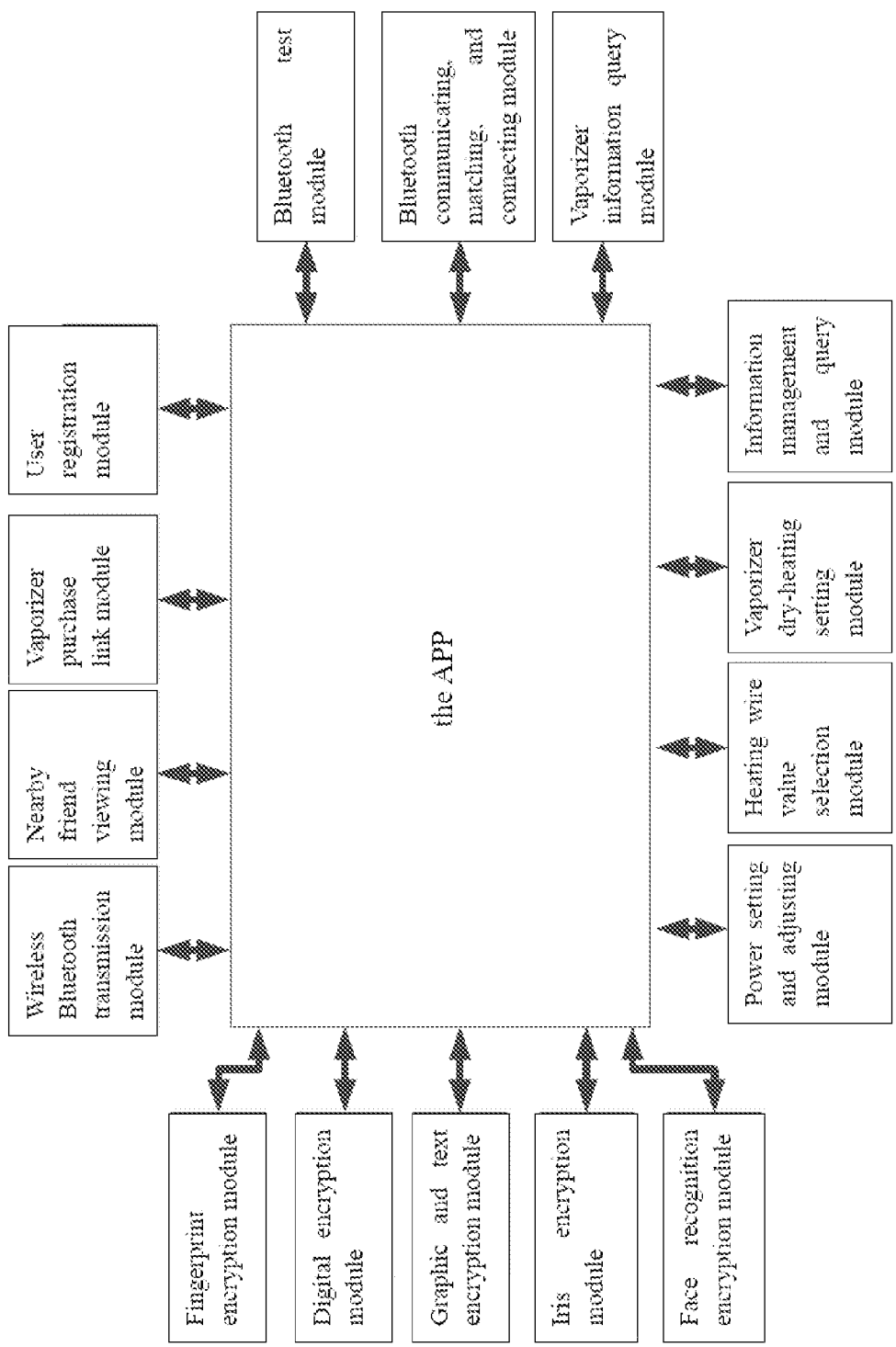
FIG. 3 is a block diagram of APP interface module for an electronic cigarette controllable by mobile software according to the disclosure.

Referring to FIG. 3, the operation interface of the APP includes a digital encryption module, a graphic encryption module, a fingerprint encryption module, an iris encryption module, and a face recognition encryption module. Herein, the digital encryption module is configured to identify the preset digital encryption information, the graphic encryption module is configured to identify the preset graphic encryption information, the fingerprint encryption module is configured to identify the preset fingerprint encryption information, the iris encryption module is configured to identify the preset iris encryption information, and the face recognition encryption module is configured to identify the face encryption information. By running the APP, all of the abovementioned encryption information can be processed into unified encrypted information and sent to the microcontroller of the electronic cigarette. The user may freely select one of them to activate the device.

Referring to FIG. 3, the operation interface of the APP includes a power setting and adjusting module, a heating resistor value selection module, a vaporizer dry-heating setting module, and an information management and query module. Herein, the power setting and adjusting module is configured to adjust the power of the heating resistor, to achieve controlling of the amount of the vapor generated during using. The heating resistor value selection module is configured to select corresponding resistance value of the heating resistor for various vaporizers, to achieve corresponding heating temperature for various vaporizers. The vaporizer dry-heating setting module is configured to set different preset dry-heating temperature values for various vaporizers. The information management and query module is configured to collect, manage and query the information with respect to usage records.

Referring to FIG. 3, the operation interface of the APP includes a Bluetooth test module, a Bluetooth communication and matching module, and a vaporizer information query module. Herein, the Bluetooth test module is configured to test and determine whether the mobile Bluetooth and the Bluetooth data transmission unit are successfully matched and connected. The Bluetooth communication and matching module is configured to match and connect the mobile Bluetooth and the Bluetooth data transmission unit. The vaporizer information query module is configured to query relevant information with respect to the type of the vaporizer connected with the battery assembly.

Referring to FIG. 3, the operation interface of the APP includes a wireless Bluetooth transmission module, a nearby friend viewing module, a vaporizer purchase link module, and a user registration module. Herein, the wireless Bluetooth transmission module is configured to communicate with the mobile Bluetooth. The nearby friend viewing module is configured to allow viewing of the user information of the nearby users who have same electronic cigarettes, and to provide access to friend registration so as to facilitate communication. The vaporizer purchase link module is configured to provide links to the web-pages of the electronic cigarette manufacturer or seller, to allow users to conveniently select and purchase new products. The user registration module may be configured to allow registration of users as members of the electronic cigarette, to facilitate post-sales service.

Figure 4:
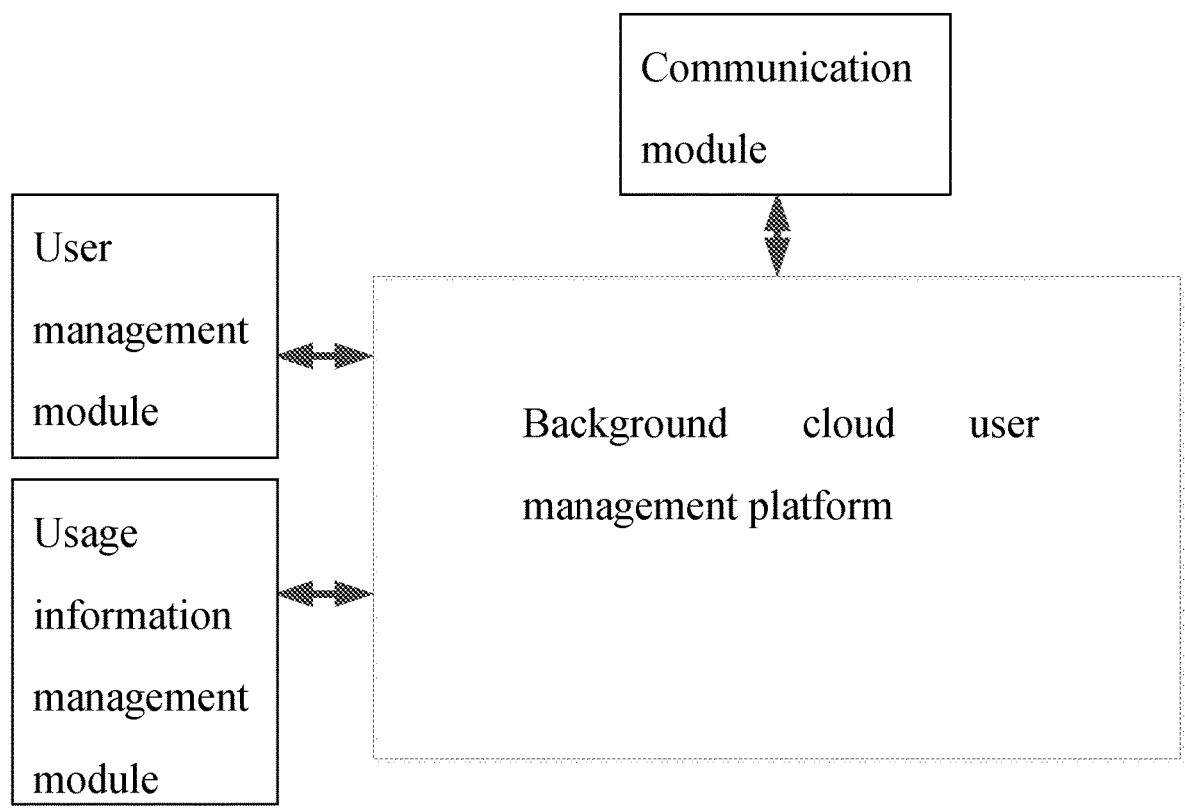
FIG. 4 is a module block diagram of a background cloud user management platform of APP for an electronic cigarette controllable by mobile software according to the disclosure.

Referring to FIG. 4, the APP is further provided with a background cloud user management platform, and the background cloud user management platform comprises a communication module, a user management module, and a usage data query module. Herein, the communication module is configured to communicate with the user's APP. The user management module is configured to allow the sellers to manage registered users. The usage data query module is configured to query information with respect to usage data of the electronic cigarette, to allow the sellers to provide after-sales maintenance.

Figure 5:
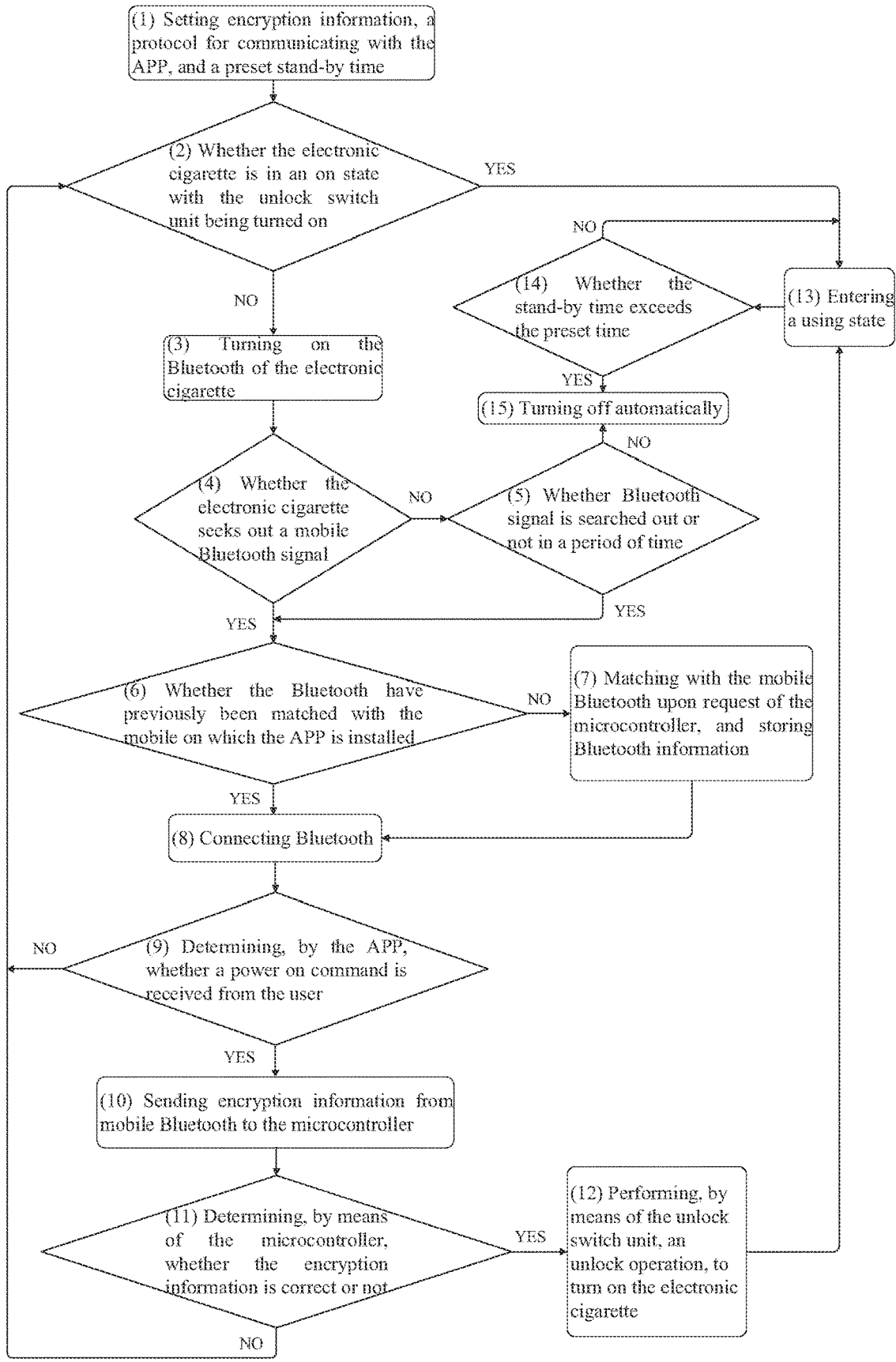
FIG. 5 is a flowchart illustrating a controlling method of an electronic cigarette controllable by mobile software according to the disclosure.

Referring to FIG. 5, the disclosure provides another technical solution as follow. A controlling method of an electronic cigarette controllable by mobile software comprises steps as follows.

(1) Setting encryption information for activating the electronic cigarette, a protocol for communicating with the APP, and a preset stand-by time in the microcontroller of the electronic cigarette, before delivery;

(2) Determining, by means of the microcontroller, whether the unlock switch unit is turned on and the electronic cigarette is in an on state, if yes, go to the step (13); if no, go to the next step;

(3) Turning on the Bluetooth of the electronic cigarette;

(4) Determining whether the Bluetooth of the electronic cigarette seeks out a mobile Bluetooth signal, if yes, go to the step (6); if no, go to the next step;

(5) Wait for a period of time, determining whether a mobile Bluetooth signal is searched or not, if yes, go to the next step; if no, go to the step (15);

(6) Determining, by means of the microcontroller, whether the Bluetooth have been matched with the mobile (on which the APP is installed) before, if yes, go to the step (8); if no, go to the next step;

(7) Matching, by means of the microcontroller, the electronic cigarette Bluetooth with the mobile Bluetooth, and storing mobile Bluetooth information;

(8) Connecting mobile Bluetooth;

(9) Determining, by the APP, whether a power on command is received from the user, if yes, go to the next step; if no, go back to the step (2);

(10) Sending encryption information by mobile Bluetooth to the Bluetooth data transmission unit of the electronic cigarette;

(11) Determining, by means of the microcontroller, whether the encryption information is correct or not, if yes, go to the next step; if no, go back to the step (2);

(12) Controlling, by means of the microcontroller, the unlock switch unit to perform an unlock operation, to power on the electronic cigarette;

(13) Entering a using state in which the vapor is available for the user;

(14) Entering a stand-by state when the user stops using, and determining, by means of the microcontroller, whether the stand-by time exceeds the preset time or not, if yes, go to the next step; if no, go back to the step (13);

(15) Controlling, by means of the microcontroller, the electronic cigarette to turn off automatically.

INDUSTRIAL APPLICABILITY

All the above are merely preferred embodiments of the present invention. The present invention is intended to cover all equivalent arrangements and modifications without departing from the scope of the present invention.

The invention claimed is:

1. An electronic cigarette controllable by mobile software, comprising a vaporizer and a battery assembly connected with each other, wherein the vaporizer comprises a heating resistor for heating and vaporizing electronic cigarette liquid, and the battery assembly comprises a battery and a control circuit board, wherein the control circuit board is arranged with a microcontroller, and a Bluetooth data transmission unit and an unlock switch unit which are connected with the microcontroller, wherein the Bluetooth data transmission unit is configured with a mobile software controlling terminal that is an APP installed on a smart phone, the APP contains encryption information which can be sent through mobile Bluetooth to the Bluetooth data transmission unit and then to the microcontroller, and the unlock switch unit is configured to perform an unlock and power on operation when the encryption information is identified by the microcontroller.

2. The electronic cigarette controllable by mobile software according to claim 1, wherein the control circuit board is further arranged with a resistance detection unit and a voltage output control unit, wherein the resistance detection unit is electrically connected with the heating resistor and the microcontroller respectively, the resistance detection unit is configured to detect a resistance value of the heating resistor and feedback a resistance value signal to the microcontroller, the microcontroller is electrically connected with the voltage output control unit, and the voltage output control unit is configured to output voltage to the heating resistor under control of the microcontroller.

3. The electronic cigarette controllable by mobile software according to claim 1, wherein a trigger switch is further arranged inside the vaporizer or inside the battery assembly, and the trigger switch is a microphone-type automatic air flow switch.

4. The electronic cigarette controllable by mobile software according to claim 1, wherein the control circuit board is further arranged with a battery charging unit, a battery protection unit, a battery supply unit, and a battery detection unit, wherein the battery charging unit is configured to charge the battery, the battery is configured to supply power to the voltage output control unit by the battery protection unit and the battery supply unit in sequence, the microcontroller is electrically connected with the battery charging unit, the battery protection unit, and the battery detection unit respectively, the battery detection unit is configured to detect an electrical signal of the battery and feedback to the microcontroller, and the microcontroller is configured to provide over-current protection, overload protection, and short circuit protection for the battery by means of the battery protection unit.

5. The electronic cigarette controllable by mobile software according to claim 1, wherein a display unit is arranged on an outer surface of the vaporizer or of the battery assembly and is electrically connected with the microcontroller.

6. The electronic cigarette controllable by mobile software according to claim 1, wherein an operation interface of the APP includes a digital encryption module, a graphic encryption module, a fingerprint encryption module, an iris encryption module, and a face recognition encryption module, wherein the digital encryption module is configured to identify preset digital encryption information, the graphic encryption module is configured to identify preset graphic encryption information, the fingerprint encryption module is configured to identify preset fingerprint encryption information, the iris encryption module is configured to identify preset iris encryption information, and the face recognition encryption module is configured to identify face encryption information.

7. The electronic cigarette controllable by mobile software according to claim 1, wherein an operation interface of the APP includes a power setting and adjusting module, a heating resistor value selection module, a vaporizer dry-heating setting module, and an information management and query module, wherein the power setting and adjusting module is configured to adjust a power of the heating resistor to achieve controlling of an amount of vapor generated during using, the heating resistor value selection module is configured to select corresponding resistance value of the heating resistor for various vaporizers, to achieve corresponding heating temperature, the vaporizer dry-heating setting module is configured to set an individual preset dry-heating temperature value for an individual vaporizer, and the information management and query module is configured to collect, manage and query information with respect to usage records.

8. The electronic cigarette controllable by mobile software according to claim 1, wherein an operation interface of the APP includes a Bluetooth test module, a Bluetooth communication and matching module, and a vaporizer information query module, wherein the Bluetooth test module is configured to test the mobile Bluetooth and determine whether the mobile Bluetooth is successfully matched and connected with the Bluetooth data transmission unit, the Bluetooth communication and matching module is configured to match and connect the mobile Bluetooth with the Bluetooth data transmission unit, and the vaporizer information query module is configured to query relevant information with respect to a type of a vaporizer which is connected with the battery assembly.

9. The electronic cigarette controllable by mobile software according to claim 1, wherein an operation interface of the APP includes a wireless Bluetooth transmission module, a nearby friend viewing module, a vaporizer purchase link module, and a user registration module, wherein the wireless Bluetooth transmission module is configured to communicate with the mobile Bluetooth, the nearby friend viewing module is configured to allow viewing of user information of a nearby user having a same electronic cigarette, the vaporizer purchase link module is configured to provide a link to a web-page of an electronic cigarette manufacturer or seller, to allow a user to conveniently select and purchase a new product, and the user registration module is configured to allow registration of a user as a member, to facilitate post-sales service.

10. The electronic cigarette controllable by mobile software according to claim 1, wherein the APP is further configured with a background cloud user management platform, and the background cloud user management platform comprises a communication module, a user management module, and a usage data query module, wherein the communication module is configured to communicate with a user's APP, the user management module is configured to allow a seller to manage registered user information, and the usage data query module is configured to query usage data information, to facilitate post-sales service of the seller.

11. A controlling method of controlling an electronic cigarette by mobile software, wherein the method comprises steps of:
(1) setting encryption information for turning on the electronic cigarette, a protocol for communicating with an APP, and a preset stand-by time in a microcontroller of the electronic cigarette;
(2) determining, by means of the microcontroller, whether the electronic cigarette is in an on state with an unlock switch unit being turned on, if yes, go to step (13); if no, go to next step;
(3) turning on Bluetooth of the electronic cigarette;
(4) determining whether Bluetooth of the electronic cigarette seeks out a mobile Bluetooth signal, if yes, go to step (6); if no, go to next step;
(5) determining whether a mobile Bluetooth signal is searched out or not in a period of time, if yes, go to next step; if no, go to step (15);
(6) determining, by means of the microcontroller, whether the Bluetooth have previously been matched with a mobile on which the APP is installed, if yes, go to step (8); if no, go to next step;
(7) matching, by means of the microcontroller, the Bluetooth of the electronic cigarette with the mobile Bluetooth, and storing mobile Bluetooth information;
(8) connecting mobile Bluetooth;
(9) determining, by the APP, whether a power on command is received from a user, if yes, go to next step; if no, go back to the step (2);
(10) sending encryption information to the Bluetooth data transmission unit of the electronic cigarette by mobile Bluetooth;
(11) determining, by means of the microcontroller, whether the encryption information is correct or not, if yes, go to next step; if no, go back to the step (2);
(12) controlling, by means of the microcontroller, the unlock switch unit to perform an unlock operation, to power on the electronic cigarette;
(13) entering a using process to allow the user to vape;
(14) entering a stand-by state when the user stops using, and determining, by means of the microcontroller, whether a stand-by time exceeds the preset time or not, if yes, go to next step; if no, go back to the step (13);
(15) controlling, by means of the microcontroller, the electronic cigarette to turn off automatically.

* * * * *